United States Patent
Corretja et al.

(10) Patent No.: US 10,520,587 B2
(45) Date of Patent: Dec. 31, 2019

(54) METHOD FOR OPTIMISING THE DETECTION OF MARINE TARGETS AND RADAR IMPLEMENTING SUCH A METHOD

(71) Applicant: THALES, Courbevoie (FR)

(72) Inventors: Vincent Corretja, Pessac (FR); Gilles Guerrini, Pessac (FR); Thierry Sfez, Elancourt (FR); Richard Montigny, Pessac (FR); Jean-Marc Chabroux, Elancourt (FR)

(73) Assignee: THALES, Courbevoie (FR)

( * ) Notice: Subject to any disclaimer, the term of this patent is extended or adjusted under 35 U.S.C. 154(b) by 372 days.

(21) Appl. No.: 15/492,676

(22) Filed: Apr. 20, 2017

(65) Prior Publication Data

US 2017/0307734 A1    Oct. 26, 2017

(30) Foreign Application Priority Data

Apr. 22, 2016 (FR) ...................... 16 00669

(51) Int. Cl.
| | |
|---|---|
| *G01S 7/41* | (2006.01) |
| *G01S 13/10* | (2006.01) |
| *G01S 13/24* | (2006.01) |
| *G01S 13/22* | (2006.01) |
| *G01S 13/52* | (2006.01) |

(52) U.S. Cl.
CPC ............ *G01S 7/414* (2013.01); *G01S 13/103* (2013.01); *G01S 13/106* (2013.01); *G01S 13/22* (2013.01); *G01S 13/24* (2013.01); *G01S 13/52* (2013.01)

(58) Field of Classification Search
CPC ...... G01S 13/103; G01S 13/106; G01S 13/22; G01S 13/24; G01S 13/52; G01S 7/414
USPC ........................................................ 342/159
See application file for complete search history.

(56) References Cited

U.S. PATENT DOCUMENTS

| | | | |
|---|---|---|---|
| 5,227,801 A * | 7/1993 | Pierce .................. | G01S 13/904 342/192 |
| 6,861,974 B1 | 3/2005 | Poe et al. | |
| 2013/0194126 A1* | 8/2013 | Paoletti .................. | G01S 13/04 342/55 |
| 2014/0097979 A1 | 4/2014 | Nohara et al. | |

FOREIGN PATENT DOCUMENTS

| | | |
|---|---|---|
| CN | 104 155 631 A | 11/2014 |
| FR | 2 875 013 A1 | 3/2006 |

* cited by examiner

*Primary Examiner* — Timothy A Brainard
(74) *Attorney, Agent, or Firm* — Baker & Hostetler LLP

(57) ABSTRACT

A detection method for a given mission comprises at least: one phase of analysing the environment using a waveform chosen beforehand, the signals acquired with this waveform being analysed by processing means in order to deduce therefrom environmental characteristics; and one phase of generating an optimal detection wave depending on the environmental characteristics and characteristics of the mission.

9 Claims, 4 Drawing Sheets

METHOD FOR OPTIMISING THE DETECTION OF MARINE TARGETS AND RADAR IMPLEMENTING SUCH A METHOD

CROSS-REFERENCE TO RELATED APPLICATIONS

This application claims priority to foreign French patent application No. FR 1600669, filed on Apr. 22, 2016, the disclosure of which is incorporated by reference in its entirety.

FIELD OF THE INVENTION

The present invention relates to a method for optimising the detection of marine targets. It also relates to a radar implementing such a method.

BACKGROUND

In the field of the detection of marine targets, one technical problem to be solved is the optimisation and the auto-adaptation in real time of the radar waveform used for the detection of the targets, depending on the operational requirements and on the environment acquired and analysed by the radar in real time. Contrary to land, the maritime environment perceived by the radar fluctuates (weather, current, waves, etc.).

Currently in surveillance radars, the choice of the waveform used is rather made manually by the operator from a plurality of predefined waveforms available in the radar, the operator being the person who operates the radar.

The drawbacks of this solution are in particular the following:

the required time spent by the operator analysing the operational situation (type of target to be detected, sea environment, meteorological conditions, etc.) and choosing the adapted waveform. Thus, experience shows that the operator sometimes uses a waveform without changing it during a radar pass, or even an entire mission, at the risk of not adapting the waveform to the environment;

the operator must, to make this choice judiciously, on the one hand have been trained and on the other hand have a non-negligible experience;

since the waveform is chosen from a limited number of waveforms predefined beforehand (typically between 3 and 5 for air/sea detection processing), even the best choice of the operator does not ensure that the parameters of the waveform are perfectly adapted to the target to be processed and to the environment present at the time of the mission; it will be noted that the radar has many capacities that are not exploited by the operator due to a shortage of time and a lack of knowledge;

the choice of waveform is made, by the operator, depending on his own perception and evaluation of the environment, often enriched by knowledge of meteorological information. However this evaluation may be limited in accuracy, in particular because what the operator thinks he knows is inaccurate, and does not necessarily correspond to that perceived by the radar during its detection processing. It depends on the operator and on his workload.

Automatic management of the waveform also exists in certain combat radars. It allows, in particular for air-air modes, the passage between standby and pursuit modes, the lock-on domain at long distances and that at shorter distances or optionally the passage of targets to high-off boresight sectors, to be managed. This type of management effectively allows the load on the operator to be lightened and the performance of the radar to be improved. However, on the one hand it does not take into account the fluctuating nature of the maritime environment, such as sea clutter in particular, which is a key performance factor, and on the other hand it makes a selection from predefined waveforms, but does not optimise in real time the parameters of the waveform.

SUMMARY OF THE INVENTION

One aim of the invention is in particular to surmount the aforementioned drawbacks. For this purpose, one subject of the invention is a method for optimising the detection of marine targets by an airborne radar; said detection being made for a given mission, said method includes at least:

one phase of analysing the environment using a waveform chosen beforehand, the signals acquired with this waveform being analysed by processing means in order to deduce therefrom environmental characteristics; and one phase of generating an optimal detection wave depending on said environmental characteristics and characteristics of said mission;

said detection waveform being determined from a generic waveform parameters of which, chosen from the following list, are varied:
  repetition frequency;
  transmission frequency;
  frequency agility;
  transmission band;
  form factor;
  polarisation.

Said environmental characteristics for example include the characteristics of the sea clutter, these characteristics for example belonging to the following list:
  level of reflectivity of the clutter, obtained by a radiometric analysis;
  statistical distribution of the received clutter power, obtained by a statistical analysis;
  spectral spread and position of the clutter, obtained by a spectral analysis;
  presence or not of clutter spikes.

The characteristics of said mission for example include the characteristics of the type of target to be detected, these characteristics for example being comprised in the following list:
  the length of the targets;
  the radar cross section of the targets;
  the structure of the targets;
  the speed of the targets.

The characteristics of said mission for example include the distance domain in which it is sought to detect the targets.

Said mission is for example a maritime patrol or maritime surveillance mission and in particular a sea rescue mission.

Another subject of the invention is a radar implementing the method described above.

BRIEF DESCRIPTION OF THE DRAWINGS

Other features and advantages of the invention will become apparent from the following description which is given with reference to the appended drawings, which show.

DETAILED DESCRIPTION

Figure 1:
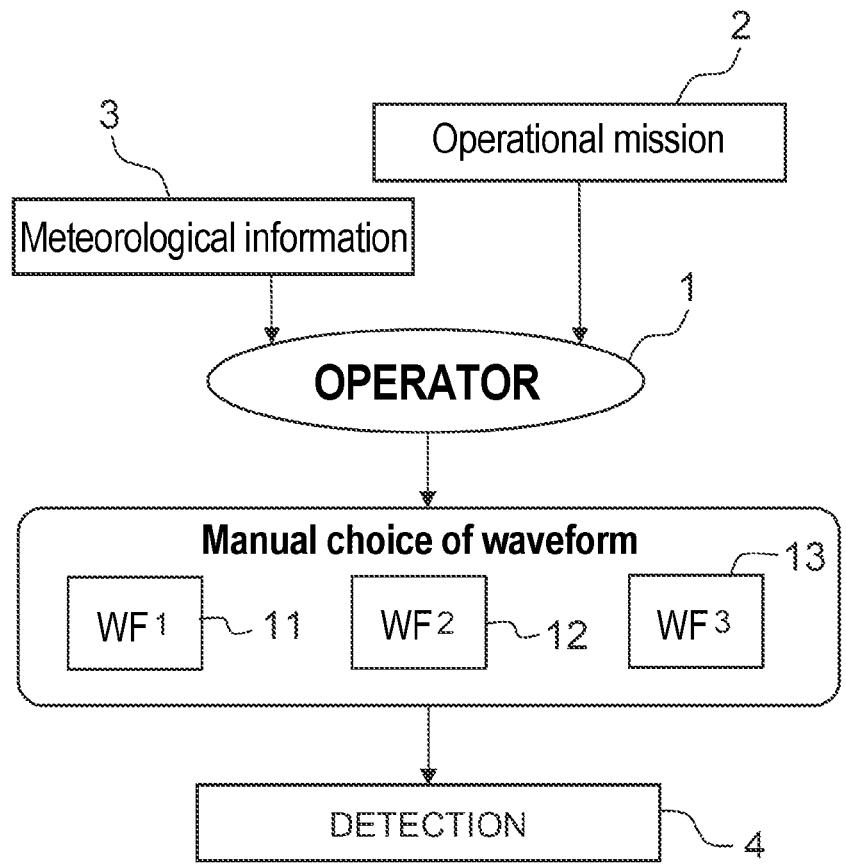
FIG. 1, a prior-art method.

FIG. 1 illustrates a waveform-selection solution according to the prior art. An operator 1 manually makes the choice of a waveform from a plurality of possible waveforms 11, 12, 13. This choice is made depending on the operational mission 2 and the environment, and in particular on the meteorological conditions 3. Depending on these elements, the choice is made with the objective of optimising the ability of the radar to make a detection 4. The drawbacks of this solution were described above.

Figure 2:
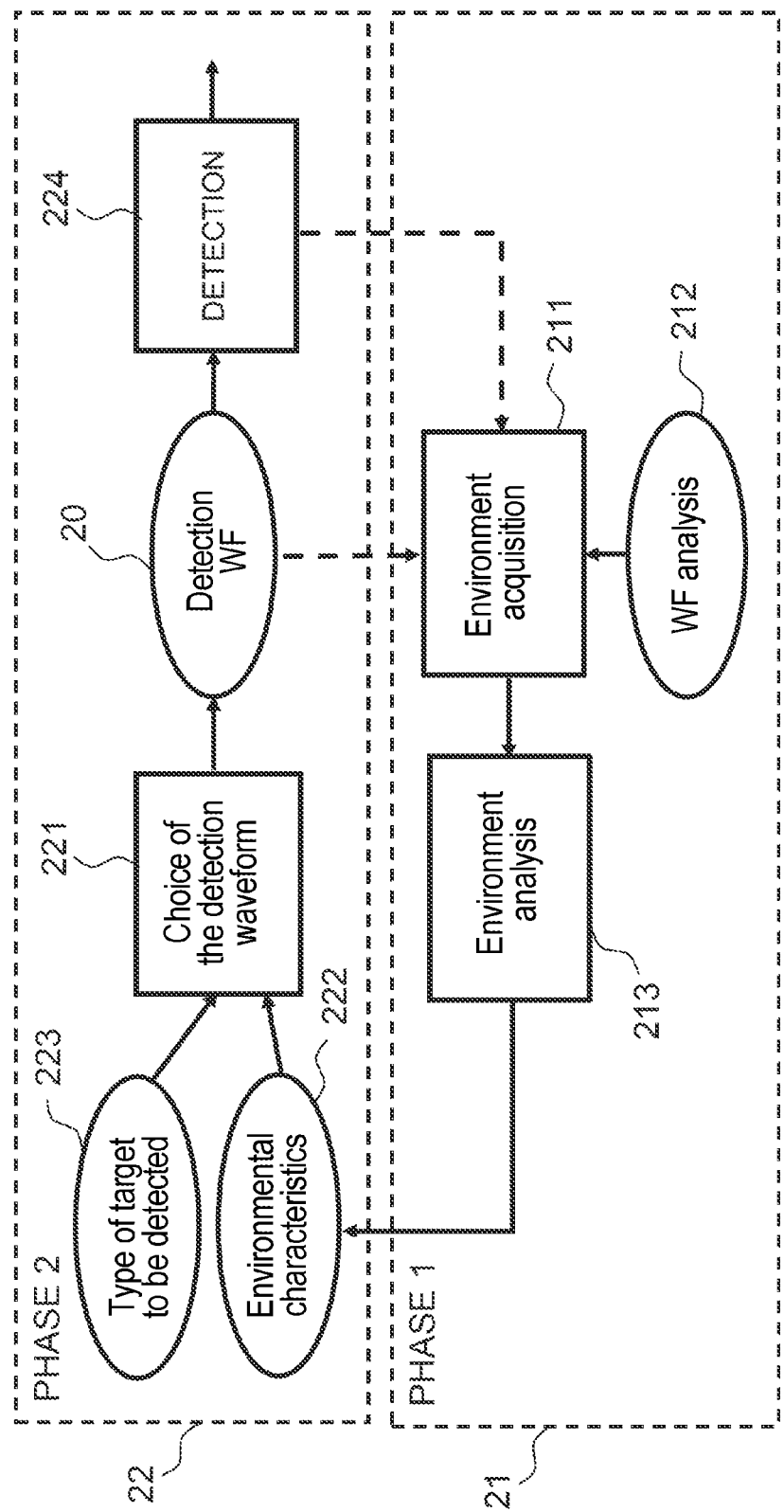
FIG. 2, an illustration of the method according to the invention.

FIG. 2 illustrates possible phases of implementation of a method according to the invention. By virtue of the invention, the radar is capable of evaluating its environment in all its detection domain in order to analyse and deduce therefrom, depending on the characteristics of the mission, the waveform most adapted to this mission, i.e. the optimal waveform. In other words, this waveform is that which ensures the maximum detection performance. To this end, the method according to the invention includes at least two phases.

In a first phase 21, the environment is analysed in all the detection domain of the radar, then, in a second phase 22, once the environment is known, the optimal detection waveform is automatically generated depending on the operational requirements of the mission and on the knowledge of the environment. The mission is in particular a patrol or maritime surveillance mission. It is for example performed in the context of a sea rescue. In this example, a radar according to the invention then has the mission of detecting the one or more marine targets to be rescued.

In the first phase 21, the radar acquires 211 environmental data using a deterministic waveform 212, called the analysis waveform, which is chosen beforehand. This waveform is designed for the analysis of the environment. The signals needed for the analysis are first of all acquired during a lapse of time of a plurality of seconds in order to scan all the azimuthal distance domain that the radar must cover: one full radar antenna rotation for example.

Next, the signals acquired with this waveform 212 are analysed by a processing operation 213 called the analysis processing operation. At the end of this analysis, the environmental characteristics 222 are obtained.

In the second phase 22, the radar automatically generates 221 the optimal detection waveform 20 depending on the analysis results (the environmental characteristics) and on the mission, which gives the type of targets 223 to be detected, by choosing all the primary parameters of its waveform and of the electromagnetic radiation (for example:
repetition frequency,
transmission frequency,
frequency agility,
transmission band,
form factor, its pulse width, polarisation, etc.).

Once the detection 224 has been carried out for one type of target, the analysis and detection cycle may be restarted for another type of target.

If the detection phase 22 lasts a certain time, it is possible to envisage repeating an analysis phase 21 in order to automatically update the detection waveform 20 chosen depending on the environment. Under these conditions, the current detection waveform may also serve as analysis waveform if the latter is compatible with the expected data, i.e. it may possibly be used for the acquisition 211 of the environment.

A plurality of criteria and/or characteristics are taken into account when selecting the analysis waveform and when selecting the detection waveform.

Selection of the Analysis Waveform:

One aim of the analysis waveform is to determine the main characteristics of the sea clutter influencing the choice of the detection waveform. These characteristics are the following:
level of reflectivity of the clutter, obtained by a radiometric analysis;
statistical distribution of the received clutter power, obtained by a statistical analysis;
spectral spread and position of the clutter, which are obtained by a spectral analysis;
presence or not of clutter spikes.

This waveform is chosen to allow the following characteristics to be measured: transmission band:
its radial resolution must be sufficiently fine to observe any spike phenomena;
repetition frequency:
the repetition frequency of the pulses thereof must be sufficiently high to allow the spectral analysis to be performed without aliasing;
in order to ensure the statistical and radiometric analysis is not corrupted by distance aliasing caused by an excessively high repetition frequency, a compromise is made between the preceding constraint and this one, which compromise may for example lead to the choice of a high LRF (low-repetition-frequency mode) or to the transmission of a plurality of transmission blocks at different pulse repetition frequencies;
transmission frequency with respect to frequency agility:
the emitted frequency agility is also taken into account for the statistical and radiometric analysis but is combined with the inverse constraint for the spectral analysis, a plurality of transmission blocks at different repetition frequencies and different transmission frequencies may be one solution;
polarisation:
the polarisation is also possibly chosen depending on elevation angle, but an analysis using two different polarisations is one advantageous solution, some transmission blocks being horizontally polarised and some being vertically polarised;
form factor, or pulse width:
the average emitted power allows all the distance domain to be detected to be covered.

Lastly, the acquisition time of the clutter with the analysis waveform must remain short, compatible with the requirements of the mission.

Selection of the Detection Waveform Depending on the Operational Requirements and on Knowledge of the Clutter:

The method according to the invention uses the principle of a generic waveform calling on a plurality of parameters. The waveform is optimised by optimising these parameters. These parameters are the following:
its repetition frequency;
its transmission frequency;
the use of a frequency agility or not;
its transmission band;
its form factor, or pulse width;
its polarisation;

depending on the operational mission and more particularly:
- the length of the type of targets that it is sought to detect;
- the radar cross section (RCS) of the type of targets that it is sought to detect;
- the speed of the type of targets that it is sought to detect;
- the structure of the type of targets that it is sought to detect; for example a ship (parallel to the surface of the water) or a periscope (perpendicular to the surface of the water);
- the distance domain in which it is sought to detect targets;

and depending on the knowledge of the clutter, in terms of:
- level of reflectivity of the clutter;
- statistical distribution of the received clutter power;
- spectral spread and position of the clutter;
- presence or not of spikes.

The table below summarises the possible dependencies between the parameters of the waveform, operational characteristics and the characteristics of the clutter.

Figure 4:
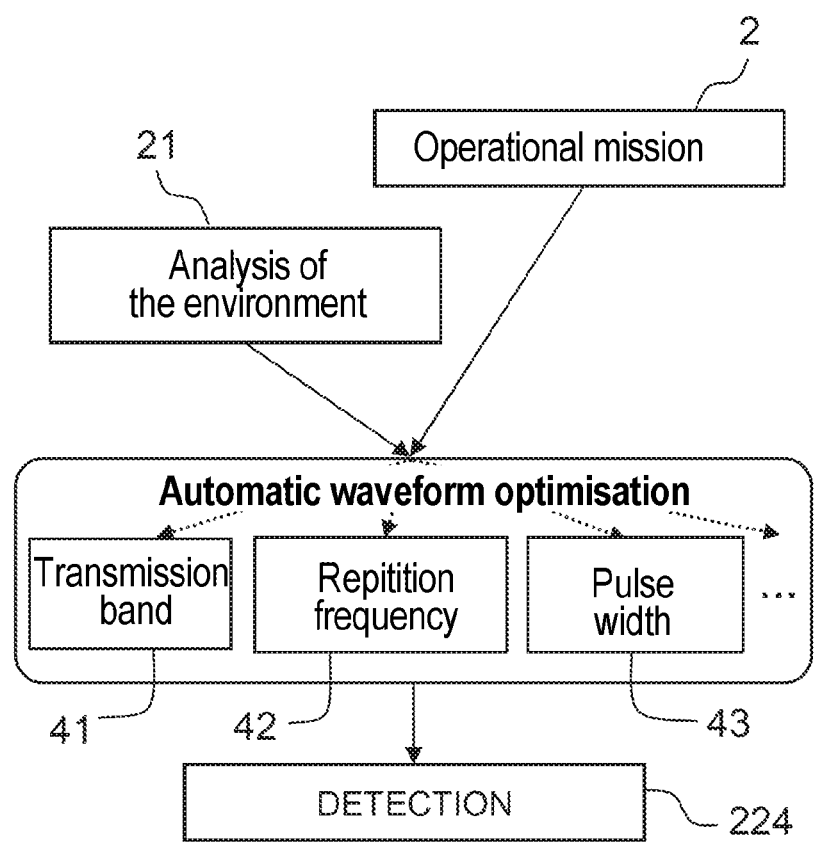
FIG. 4, the operating principle of a radar according to the invention.

FIG. 4 illustrates the operating principle of a radar implementing the method according to the invention. The operator no longer intervenes to select the waveform, the choice being made automatically. The radar analyses 21 in real time its environment in all its detection domain, then depending on the result of its analysis 21 and on the operational mission 2, automatically defines the optimal waveform, i.e. the waveform maximising the probability of detection, for each zone of its detection domain.

The waveform is generated from a generic waveform defined by the parameters 41, 42, 43 described above. The optimisation of the waveform consists in defining in real time the optimal value of these parameters. The radar therefore no longer has at its disposal a limited number of waveforms but in contrast an almost limitless number.

By way of example, if the operational requirement is to detect medium targets up to the radar horizon, then the radar

|  |  | Characteristics of the sought-after elements | | | | Search | Characteristics of the clutter | | | |
| --- | --- | --- | --- | --- | --- | --- | --- | --- | --- | --- |
|  |  | Target length | Target RCS | Target structure | Target speed | distance domain | Clutter level | Clutter statistics | Clutter spectrum | Presence of spikes |
| Parameters of the waveform | Repetition frequency |  |  |  | X | X |  |  | X |  |
|  | Transmission band | X | X |  |  |  |  | X |  | X |
|  | Transmission frequency Frequency agility |  | X |  |  |  |  | X |  |  |
|  | Form factor Pulse width |  | X |  |  |  | X |  |  |  |
|  | Polarisation |  |  | X |  |  | X | X |  | X |

Once the detection waveform 20 has been established, the detection 224 may be carried out.

Figure 3:
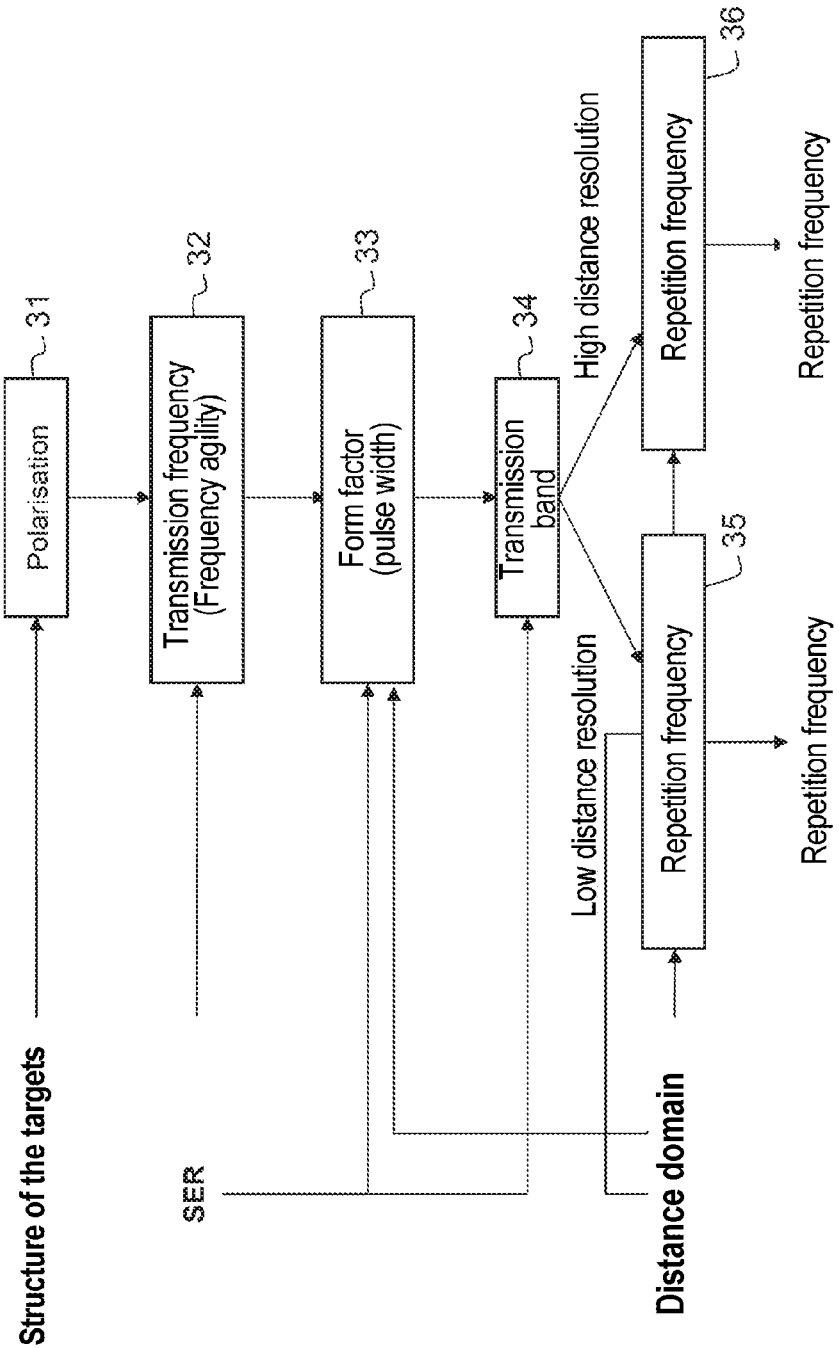
FIG. 3, an example of a decision tree that may be used in a method according to the invention.

FIG. 3 illustrates a simple example of a decision tree that may be used to manage a conflicting choice of parameters. Specifically, certain parameters may be conflicting. For example, it is complicated to detect a target of low RCS at great distance. The example of FIG. 3 illustrates a case where the radar chooses to privilege the transmission band, i.e. distance resolution, with respect to the search distance domain. More precisely, the various parameters of the detection waveform are considered in succession depending on the characteristics of the operational mission: to start with the structure of the targets to be detected is analysed in order to define 31 the polarisation, then their RCS is analysed in order to deduce 32 therefrom the transmission frequency and whether or not frequency agility will be used. The RCS is again used to define 33 the form factor and to define 34 the transmission band. Once the transmission band has been set, the repetition frequency is determined depending on whether the distance resolution may be low 35 or whether the distance resolution must be high.

More generally, a decision tree of the type shown in FIG. 3 is for example constructed, this tree taking into account all the parameters of the waveform to be optimised and all the input constraints, which in particular are defined by the type of target to be detected and the environmental characteristics.

A decision tree is one way of solving this type of conflict problem. Other techniques may be used such as the use of an expert system for example.

analyses the mission and determines the parameters of the generic waveform. Thus, it follows therefrom that:
- the medium targets correspond to horizontal structures, leading to the choice of a horizontal polarisation;
- the medium targets have an RCS of medium size, allowing frequency agility to be opportunely used, the target responding to one or other frequency;
- the pulse width is determined:
  - so as to allow detection at distance;
  - depending on the form factors that the transmitter of the radar is able to transmit;
- the distance resolution must be about a few tens of metres (corresponding to a medium RCS);
- from which the transmission band to be selected is deduced, in the present case a narrow transmission band;
- the fact that a narrow band is used means that a very low repetition frequency may be used;
- the repetition frequency is selected to be low so that the maximum unambiguous range is greater than the distance to the horizon.

The invention advantageously allows the probability of success of an operational mission to be maximised by using information known a priori about this mission in order to optimise the detection waveform used to accomplish this mission. Such a mission is the detection of marine targets, for example for sea rescue operations.

The main advantages of the invention are in particular the following:
- the radar detection processing is auto-adapted and personalised in order to optimise the capacities 4 of the radar;

operator training is de-skilled and simplified;

the level of expertise required by operators is decreased;

the amount of stress on and the workload of operators during their missions is decreased and they can thus concentrate on the latter as use of the radar requires less effort.

The invention claimed is:

1. A method for optimising the detection of marine targets by an airborne radar, wherein the detection being made for a given mission, said method comprises at least:
   one phase of analysing the environment using a waveform chosen beforehand, the signals acquired with this waveform being analysed by processing means in order to deduce therefrom environmental characteristics; and
   one phase of generating a detection wave depending on said environmental characteristics and characteristics of said mission;
   said detection waveform being determined from a generic waveform parameters of which, chosen from the following list, are varied:
   repetition frequency;
   transmission frequency;
   frequency agility;
   transmission band;
   form factor;
   polarisation.

2. The method according to claim 1, wherein said environmental characteristics include the characteristics of the sea clutter.

3. The method according to claim 2, wherein the characteristics of the sea clutter belong to the following list:
   level of reflectivity of the clutter, obtained by a radiometric analysis;
   statistical distribution of the received clutter power, obtained by a statistical analysis;
   spectral spread and position of the clutter, obtained by a spectral analysis;
   presence or not of clutter spikes.

4. The method according to claim 1, wherein the characteristics of said mission include the characteristics of the type of target to be detected.

5. The method according to claim 4, wherein the characteristics of the type of targets to be detected are comprised in the following list:
   the length of the targets;
   the radar cross section of the targets;
   the structure of the targets;
   the speed of the targets.

6. The method according to claim 1, wherein the characteristics of said mission include the distance domain in which it is sought to detect the targets.

7. The method according to claim 1, wherein said mission is a maritime patrol or maritime surveillance mission.

8. The method according to claim 7, wherein said mission is a sea rescue mission.

9. Radar, wherein it is able to implement the method according to claim 1.

* * * * *